(12) United States Patent
Nock et al.

(10) Patent No.: US 6,823,521 B1
(45) Date of Patent: Nov. 23, 2004

(54) APPARATUS AND METHOD FOR COMMUNICATING BETWEEN COMPUTER SYSTEMS USING ACTIVE DATASTREAMS

(75) Inventors: Clifton Malcolm Nock, Rochester, MN (US); Christopher Robert Smith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/259,361

(22) Filed: Feb. 26, 1999

(51) Int. Cl.[7] ................................................. G06F 9/44
(52) U.S. Cl. ........................................................ 719/315
(58) Field of Search ................................. 709/313, 315, 709/310, 231, 246; 719/315, 316, 313, 310; 707/103 R (56) References Cited

U.S. PATENT DOCUMENTS

| | | | | |
|---|---|---|---|---|
| 5,327,559 A | * | 7/1994 | Priven et al. ................. | 395/700 |
| 5,339,413 A | * | 8/1994 | Koval et al. .................. | 709/231 |
| 5,421,015 A | * | 5/1995 | Khoyi et al. ................. | 709/107 |
| 5,634,124 A | * | 5/1997 | Khoyi et al. ............. | 707/103 R |
| 5,710,923 A | * | 1/1998 | Jennings et al. ............. | 709/313 |
| 5,754,849 A | * | 5/1998 | Dyer et al. ................... | 707/101 |
| 5,819,281 A | * | 10/1998 | Cummins ................ | 707/103 R |
| 5,822,521 A | * | 10/1998 | Gartner et al. ............... | 709/230 |
| 5,864,866 A | * | 1/1999 | Henckel et al. .......... | 707/103 R |
| 6,038,604 A | * | 3/2000 | Bender et al. ................ | 709/233 |

FOREIGN PATENT DOCUMENTS

| | | | | |
|---|---|---|---|---|
| WO | WO98/02813 | * | 1/1998 | G06F/9/46 |

OTHER PUBLICATIONS

F. Bustamante, et al, "The Active Streams Approach to Adaptive Distributed Systems", 1999, www.siteseer.com.*
R. Nakato, et al, "Runtime Support for Extended Types in C++", IEEE, 1995, pp. 351–359.*
J. Gotwals, et al, "pC++/streams:a Library for I/O on Complex Distributed Data Structures", PPOPP'95, ACM, 1995, pp. 11–18.*
G. Glass, "A Universal Streaming Service", C++ Report, Apr., 1996, pp. 74–83.*
Java Object Serialization Specification, Revision 1.3, JDK 1.1, Feb. 1997.*
Erich Gamma, RicharErich Gamma, Richard Helm, Ralph Johnson, John Vlissides, Design Patterns Elements of Reusable Object–Oriented Software, 1995, Addison–Wesley, pp. 1–8 and 1–9.*
Rok Sosic, Dynascope: A Tool for Program Directing, 1992, ACM, pp. 12–19.*

* cited by examiner

*Primary Examiner*—Sue Lao
(74) *Attorney, Agent, or Firm*—Martin & Associates, LLC; Derek P. Martin (57) ABSTRACT

Two computer systems communicate with each other using active datastreams that each identify executable code for sending and receiving the corresponding active datastream, and for performing any processing required by the active datastream. Each active datastream also includes a unique datastream identifier. When a first computer system (source) has a request to send to a second computer system (target), the source computer system creates an active datastream object that represents the request. Once the active datastream object is created, a method on the active datastream object is invoked to send the active datastream object to the target. A datastream factory on the target reads the datastream identifier of the transmitted active datastream object, determines from the datastream identifier the class of active datastream object being received, and creates a new instance of the class corresponding to the datastream identifier. A datastream receive mechanism on the target is a method on the new instance, which is invoked to cause the instance to populate itself from the active datastream object received from the source. Logic for replying to the request may also be provided as one or more methods defined on the active datastream class.

26 Claims, 6 Drawing Sheets

```
interface ActiveDatastream
{
    // Performs any preprocessing and sends the datastream to an
    // output stream (to the target)
610 — public abstract void send (OutputStream output);

// Receives the datastream from an input stream (from the source)
    // and performs any necessary processing on the target. This can
    // optionally return an active reply datastream object.
620 — public abstract ActiveDatastream receive (InputStream input);
}
```

FIG. 6

```
interface ActiveDatastreamFactory
{
710 —public abstract ActiveDatastream
        720 —getNextDatastream(InputStream input);
}
```

FIG. 7

```
// Sample Server:    510
ServerSocket serverSocket = new ServerSocket (port);  —— 805
while (true) {
        Socket socket = serverSocket.accept();  —— 810                              830
530    InputStream input = new BufferedInputStream (socket.getInputStream());—820
        OutputStream output = new BufferedOutputStream (socket.getOutputStream());

540— ActiveDataStreamFactory factory = new SomeActiveDataStreamFactory(); —835 while (true) {
            ActiveDataStream request = factory.getNextDataStream(input); —840
570     if (request == null) —850
                break;     —860
            ActiveDataStream reply = request.receive (input); —870
580     if (reply != null)         —880
                reply.send (output); —890
    }
}
```

FIG. 8

```
// Sample Client:
       }
      ⎧ Socket socket = new Socket (ServerName, serverPort); —910       920
520  ⎨  OutputStream output = new BufferedOutputStream (socket_.getOutputStream());
      ⎩ InputStream input = new BufferedInputStream (socket_.getInputStream); —930

550 — ActiveDataStreamFactory factory = new SomeActiveDataStreamFactory(); —940

⎧ ActiveDataStream request = new SomeRequest(); —950
560  ⎨
        ⎩ request.send (output); —960

⎧ ActiveDataStream reply = factory.getNextDatastream (input); —970
590  ⎨   if (reply != null)  —980
        ⎩      reply.send (output); —990
               }
       }
```

APPARATUS AND METHOD FOR COMMUNICATING BETWEEN COMPUTER SYSTEMS USING ACTIVE DATASTREAMS

BACKGROUND OF THE INVENTION

1. Technical Field

This invention generally relates to computer systems and more specifically relates to an apparatus and method for communicating between computer systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Figure 1:
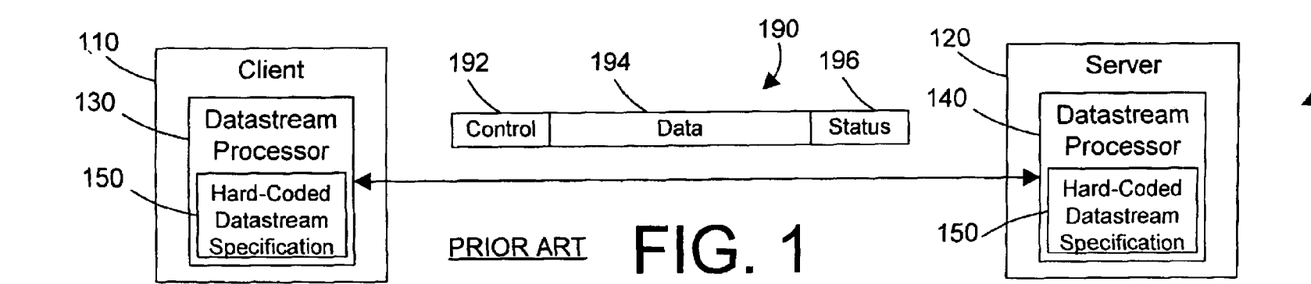
FIG. 1 is a block diagram of a prior art networked client/server computer system.

Many modern computer systems are a complex combination of different hardware and software that are interconnected on a network. Numerous different systems have evolved for computers on a network to exchange data. For example, known network protocols establish the manner for computers to exchange data. One example of a known network communication protocol is Transmission Control Protocol/Internet Protocol, known more commonly as TCP/IP. TCP/IP defines a protocol for transmitting packets of data between two computer systems on a network. However, the data packets (referred to herein as datastreams) must still be interpreted in order to be useful. In a typical network computer system, there is one computer system that serves as a network server, and many other computer systems that are clients that need to exchange data with the server. In order for the server and client to communicate, each needs to have a transmit and receive mechanism that adheres to a predetermined specification. Referring to FIG. 1, a prior art networked computer system 100 includes a client computer system 110 that has a datastream processor 130 for processing datastreams according to a hard-coded datastream specification 150. Networked computer system 100 also includes a server computer system 120 that has a datastream processor 140 for processing datastreams according to the same hard-coded datastream specification 150. The hard-coded datastream specification 150 defines a predetermined format for datastreams 190 that are transmitted between client 110 and server 120. Datastream 190 may include numerous different types of fields, including control fields 192, data fields 194, and status fields 196.

When client 110 has a request for server 120, client 110 formats a datastream 190 with appropriate fields to perform the request according to the hard-coded datastream specification 150, and sends the request to server 120. When server 120 receives the datastream 190, it decodes the datastream according to the hard-coded datastream specification 150, and performs appropriate processing according to the request. If server 120 needs to reply to the request, it encodes another datastream 190 with the reply information according to the hard-coded datastream specification 150.

The prior art methods for communicating between computer systems requires that both the client and the server have knowledge of the datastream specification. Should the datastream specification change, both the client and server software has to be modified to accommodate the change. This prior art arrangement makes code maintenance very difficult, especially in large-scale networks with many servers and a large number of clients. Any change to the datastream specification requires a corresponding change to all servers and clients. This fact alone results in significant cost when changing the datastream specification. Without a method for updating a datastream specification to allow enhanced communications between computer systems on a network without requiring corresponding changes on each computer system on the network, the cost of providing new communication capabilities on a network computer system will be excessive.

DISCLOSURE OF INVENTION

According to the preferred embodiments, two computer systems communicate with each other using active datastreams that each identify executable code for sending and receiving the corresponding active datastream, and for performing any processing required by the active datastream. Each active datastream also includes a unique datastream identifier. When a first computer system (source) has a request to send to a second computer system (target), the source computer system creates an active datastream object that represents the request. Once the active datastream object is created, a method on the active datastream object is invoked to send the active datastream object to the target. A datastream factory on the target reads the datastream identifier of the transmitted active datastream object, determines from the datastream identifier the class corresponding to the type of active datastream object being received, and creates a new instance of the class corresponding to the datastream identifier. A datastream receive mechanism on the target is a method on the new instance, which is invoked to cause the instance to populate itself from the active datastream object received from the source. Logic for replying to the request may also be provided as one or more methods defined on the active datastream class.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to communication between computers on a network, and has special applicability to object oriented computer systems. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

2. Detailed Description

According to preferred embodiments of the present invention, active datastreams are provided that allow a minimum amount of code on the client and server. Each active datastream identifies code for sending and receiving the datastream, and code for processing any request in the datastream. The active datastreams thus encapsulate the knowledge regarding how to send and receive the datastreams and how to process the requests within the datastream definitions themselves. As a result, the client and server need only know the types of datastreams that may be sent and received, and corresponding identifiers for those datastreams. By encapsulating the logic for processing a datastream within the datastream itself, updating the datastream specification requires a simple change to the datastream class, without affecting the client or server software.

Figure 2:
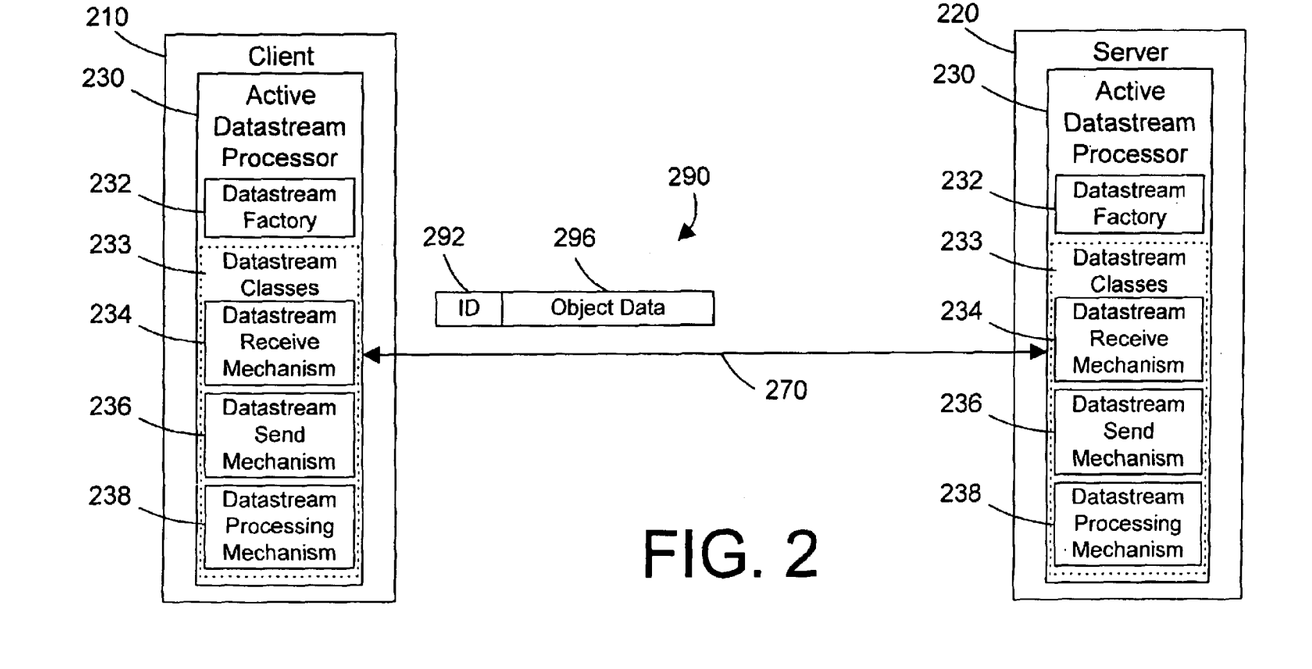
FIG. 2 is a block diagram of a networked client/server computer system according to a preferred embodiment of the invention.

Referring to FIG. 2, a networked computer system 200 in accordance with the preferred embodiment includes a client computer system 210 and a server computer system 220 that communicate over a network 270. Both client 210 and server 220 include an active datastream processor 230. The active datastream processor 230 includes a datastream factory 232, and one or more datastream classes 233 each datastream class 233 defining a datastream receive mechanism 234, a datastream send mechanism 236, and potentially defining a datastream processing mechanism 238. Client 210 and server 220 communicate over network 270 using active datastreams 290. Each active datastream 290 includes an identifier 292 and object data 296. Datastream processor 230 is a relatively small portion of code that looks at the datastream identifier (ID) 292 of an active datastream 290 and determines from the ID the datastream class 233 corresponding to the type of datastream to be received. Active datastream processor 230 includes a table or other data structure that correlates datastream IDs to datastream classes. Thus, when active datastream processor 230 receives an ID, it determines from that ID which datastream type is being received by looking in the table using the ID as a key. Once the datastream type is known, datastream factory 232 is used to create an instance of a datastream class 233 that corresponds to the type of datastream being received. Datastream receive mechanism 234 is a method defined on the datastream class 233 that is used to populate the instance of the datastream from the data coming across network 270 in active datastream 290. Once active datastream processor 230 receives the active datastream and populates the corresponding datastream instance, datastream processing mechanism 238 may be invoked to perform any processing required by the request. Active datastream processor 230 invokes datastream send mechanism 236 when an active data stream 290 needs to be sent over network 270. In the preferred embodiments, datastream receive mechanism 234, datastream send mechanism 236, and datastream processing mechanism 238 are all methods defined by a datastream class 233 that corresponds to the datastream 290 being received. The specific functions of datastream factory 232, datastream receive mechanism 234, datastream send mechanism 236, and datastream processing mechanism 238 are described in more detail below.

Datastream 290 is an instance of a datastream class 233 that defines most of the logic required to send, receive and process the datastream instance. Datastream 290 includes a unique datastream identifier 292 that is used to identify the type of datastream being received. Data 296 represents object data, if any, that is within the active datastream 290. Active datastream processor 230 determines from the datastream ID which datastream class 233 corresponds to the ID, and invokes executable code on the datastream class 233 for sending and receiving the active datastream, and for performing the request that the active datastream represents. In the preferred embodiment, this executable code includes a send method (corresponding to datastream send mechanism 236), a receive method (corresponding to datastream receive mechanism 234), and one or more methods (corresponding to datastream processing mechanism 238) to process the active datastream or carry out a request represented by the active datastream. Datastream 290 is referred to herein as an "active" datastream because its class defines executable code (i.e., send, receive, and process methods), which allow the new datastream instance to operate on the transmitted active datastream and to perform other operations as needed to fulfill a request. This is in contrast to prior art datastreams 190 shown in FIG. 1, which may contain control 192, data 194, and status 196, but do not identify executable code for sending, receiving and processing the datastream. By identifying executable code that corresponds to each active datastream, the logic for sending and receiving the active datastream, as well as additional logic for any required processing, is encapsulated within each active datastream class 233.

Figure 3:
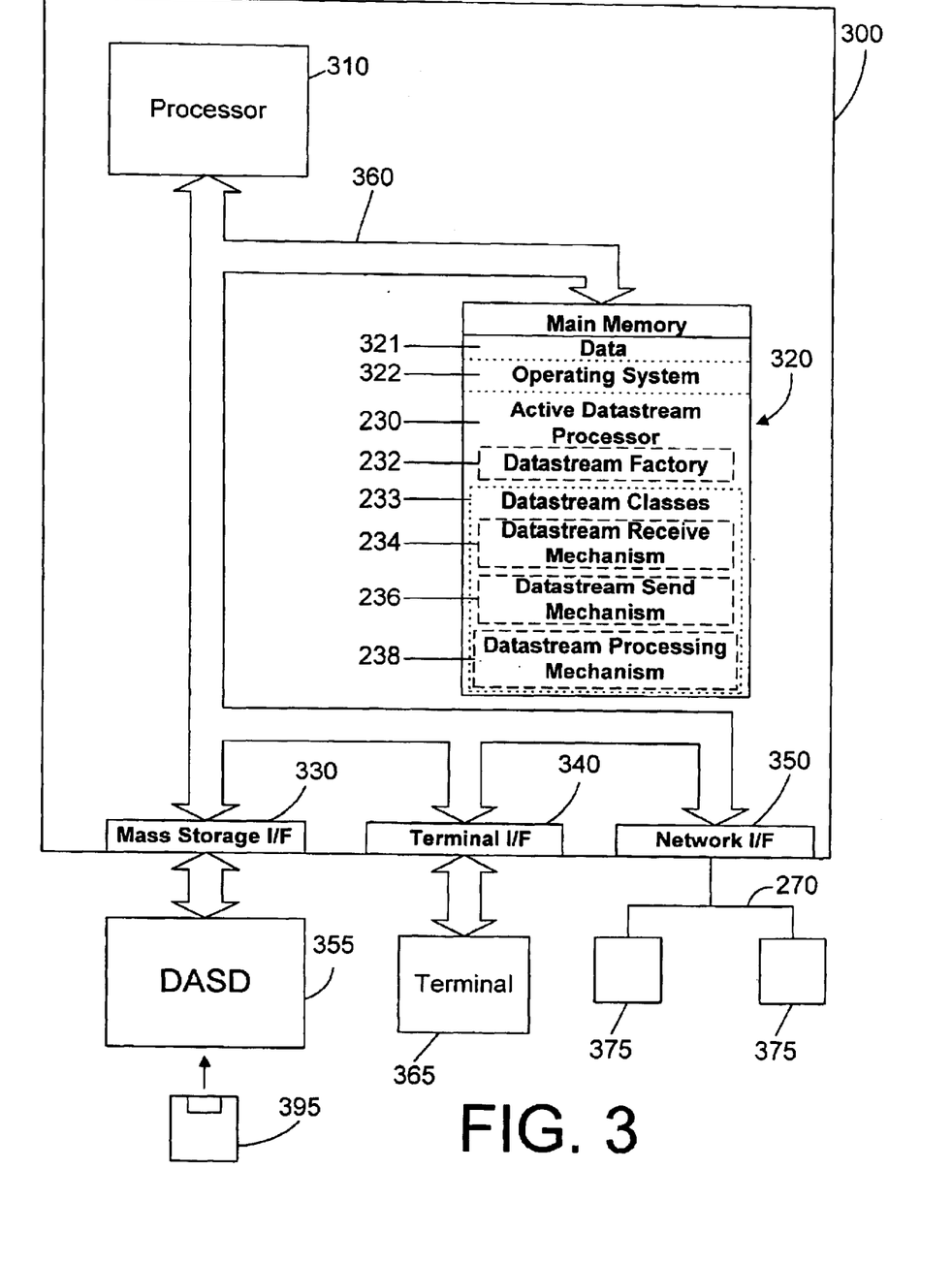
FIG. 3 is a block diagram of a computer system corresponding to the client or server in FIG. 2.

Referring to FIG. 3, a computer system 300 is representative of both client 210 and server 220 in FIG. 2, but shows additional detail not shown in FIG. 1. Computer system 300 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 3, computer system 300 comprises a processor 310 connected to a main memory 320, a mass storage interface 330, a terminal interface 340, and a network interface 350. These system components are interconnected through the use of a system bus 360. Mass storage interface 330 is used to connect mass storage devices (such as a direct access storage device 355) to computer system 300. One specific type of direct access storage device is a floppy disk drive, which may store data to and read data from a floppy diskette 395.

Main memory 320 in accordance with the preferred embodiments contains data 1321, an operating system 322, and an active datastream processor 230. As discussed above with respect to FIG. 2, active datastream processor 230 includes a datastream factory 232, one or more datastream classes 233, a datastream receive mechanism 234, a datastream send mechanism 236, and a datastream processing mechanism 238. Computer system 300 utilizes well known virtual addressing mechanisms that allow the programs of computer system 300 to behave as if they only have access to a large, single storage entity instead of access to multiple, smaller storage entities such as main memory 320 and DASD device 355. Therefore, while data 321, operating system 322, and active datastream processor 230 are shown to reside in main memory 320, those skilled in the art will recognize that these items are not necessarily all completely contained in main memory 320 at the same time. It should also be noted that the term "memory" is used herein to generically refer to the entire virtual memory of computer system 300.

Data 321 represents any data that serves as input to or output from any program in computer system 300. Operating system 322 is a multitasking operating system known in the industry as OS/400; however, those skilled in the art will appreciate that the spirit and scope of the present invention is not limited to any one operating system. Operating system 322 preferably supports an object oriented programming environment such as that provided, for example, by the Java programming language.

Active datastream processor 230 is a communication interface for computer system 300, and sends and receives active datastreams, such as datastream 290 of FIG. 2. In the preferred embodiments, datastream 290 is an object oriented object. Datastream factory 232 is used to create an instance of a datastream class 233 that corresponds to the type of datastream being received. There is defined one datastream class 233 for each different type of datastream that may be sent between client 210 and server 220. Datastream receive mechanism 234 is executable code on the datastream class 233 that is invoked by active datastream processor 230 to populate the datastream instance returned by datastream factory 232 with the data from datastream 290. In the preferred embodiment, datastream receive mechanism 234 is a "receive" method defined by the datastream class 233 to receive datastream 290 to populate the new instance of the datastream class 233. In similar fashion, datastream send mechanism 236 invokes executable code on datastream 290 when datastream 290 needs to be sent over network 270. In the preferred embodiment, datastream send mechanism 236 invokes a "send" method defined by the interface on datastream 290, which is defined by the datastream class 233 of which datastream 290 is an instance. Invoking the "send" method on datastream 290 causes the datastream 290 to send itself over network 270. Datastream processing mechanism 238 includes executable code to perform any suitable request that is encapsulated within datastream 290. A significant advantage of the present invention is that datastream 290 identifies executable code corresponding to methods represented by datastream receive mechanism 234, datastream send mechanism 236, and datastream processing mechanism 238. In other words, datastream 290 is an object that identifies the code on a corresponding datastream class 233 to send, receive, and process itself.

Processor 310 may be constructed from one or more microprocessors and/or integrated circuits. Processor 310 executes program instructions stored in main memory 320. Main memory 320 stores programs and data that processor 310 may access. When computer system 300 starts up, processor 310 initially executes the program instructions that make up operating system 322. Operating system 322 is a sophisticated program that manages the resources of computer system 300. Some of these resources are processor 310, main memory 320, mass storage interface 330, terminal interface 340, network interface 350, and system bus 360.

Although computer system 300 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 310. However, those skilled in the art will appreciate that the present invention applies equally to computer systems that simply use I/O adapters to perform similar functions.

Terminal interface 340 is used to directly connect one or more terminals 365 to computer system 300. These terminals 365, which may be non-intelligent (i.e., dumb) terminals or fully programmable workstations, are used to allow system administrators and users to communicate with computer system 300. Note, however, that while terminal interface 340 is provided to support communication with one or more terminals 365, computer system 300 does not necessarily require a terminal 365, because all needed interaction with users and other processes may occur via network interface 350.

Network interface 350 is used to connect other computer systems and/or workstations (e.g., 375 in FIG. 3) to computer system 300 across a network 270. The present invention applies equally no matter how computer system 300 may be connected to other computer systems and/or workstations, regardless of whether the network connection 370 is made using present-day analog and/or digital techniques or via some networking mechanism of the future. In addition, many different network protocols can be used to implement a network. These protocols are specialized computer programs that allow computers to communicate across network 370. TCP/IP (Transmission Control Protocol/Internet Protocol) is an example of a suitable network protocol.

It is also important to point out that the presence of network interface 350 within computer system 300 means that computer system 300 may engage in cooperative processing with one or more other computer systems or workstations on network 370. Of course, this in turn means that the programs and data shown in main memory 320 need not necessarily all reside on computer system 300. For example, one or more portions shown in main memory 320 may reside on another system and engage in cooperative processing with one or more objects or programs that reside on computer system 300. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 395 of FIG. 3) and CD ROM, and transmission type media such as digital and analog communications links.

Figure 4:
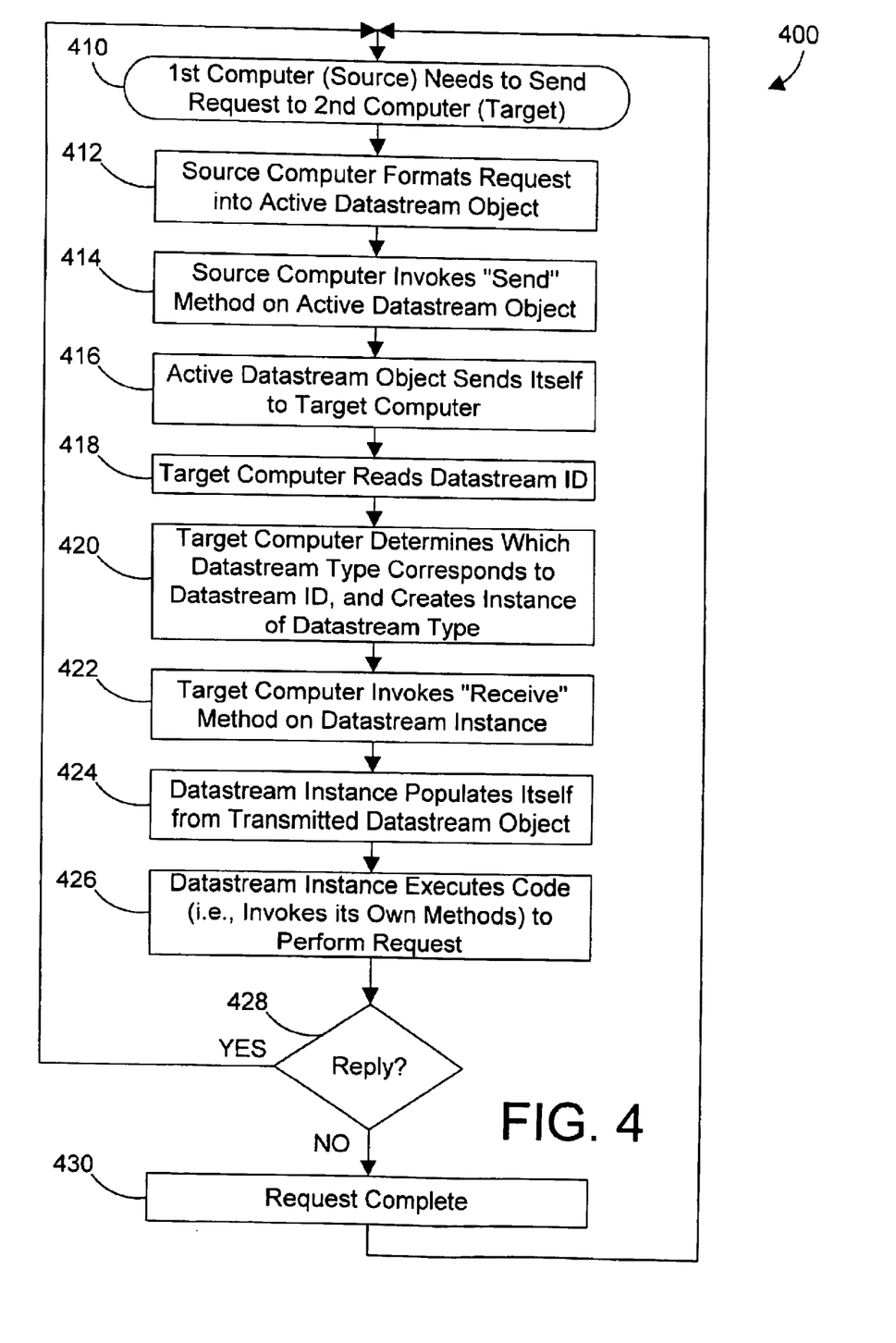
FIG. 4 is a flow diagram of a method in accordance with a preferred embodiment of the present invention.

Referring to FIG. 4, a method 400 in accordance with the preferred embodiments begins when one computer, referred to herein as the source computer, needs to send a request to another computer, referred to herein as the target computer (step 410). We assume in step 410 that all datastream classes 233 that correspond to the various types of defined datastreams are already loaded on both source and target computer systems, along with a table or other data structure that correlates these classes with the datastream identifiers 292 for each class. The source computer formats the request into an active datastream object (step 412) by invoking a constructor method on one of the datastream classes that corresponds to the type of request. Each active datastream object includes a datastream identifier 292, as shown in FIG. 2. The source computer then invokes the "send" method on the active datastream object (step 414), which causes the active datastream object to send itself to the target computer (step 416). The target computer reads the datastream identifier 292 (step 418), and determines from the datastream ID the datastream type that is being sent, and creates an instance of the datastream class 233 corresponding to the datastream type (step 420). This instance is essentially an empty shell with the interface defined by the datastream class 233. The target computer then invokes the "receive" method on the datastream instance (step 422), which causes the datastream instance to populate itself from the transmitted datastream object (step 424). The datastream instance then executes one or more of its methods to perform the request (step 426). At this point the target computer determines whether a reply to the request is needed (step 428). If a reply is needed (step 428=YES), an active datastream needs to be transmitted in the other direction, which means that the source computer becomes the target computer, and the target computer becomes the source computer. At this point step 410 is true (with the source and targets reversed), and method 400 is repeated to send the reply. If no reply is needed (step 428=NO), the processing of the request is complete (step 430), and method 400 waits for the next request in step 410. Note that method 400 processes any datastream, and no distinction is made between a request, a reply, or any other type of datastream. This feature allows the active datastream processor 230 to be identical on both source and target computer systems, rather than having a special client version and a special server version. Of course, with only one version to maintain, the maintenance of datastream processor 230 is much easier than maintaining separate client and server versions as practiced in the prior art.

Figure 5:
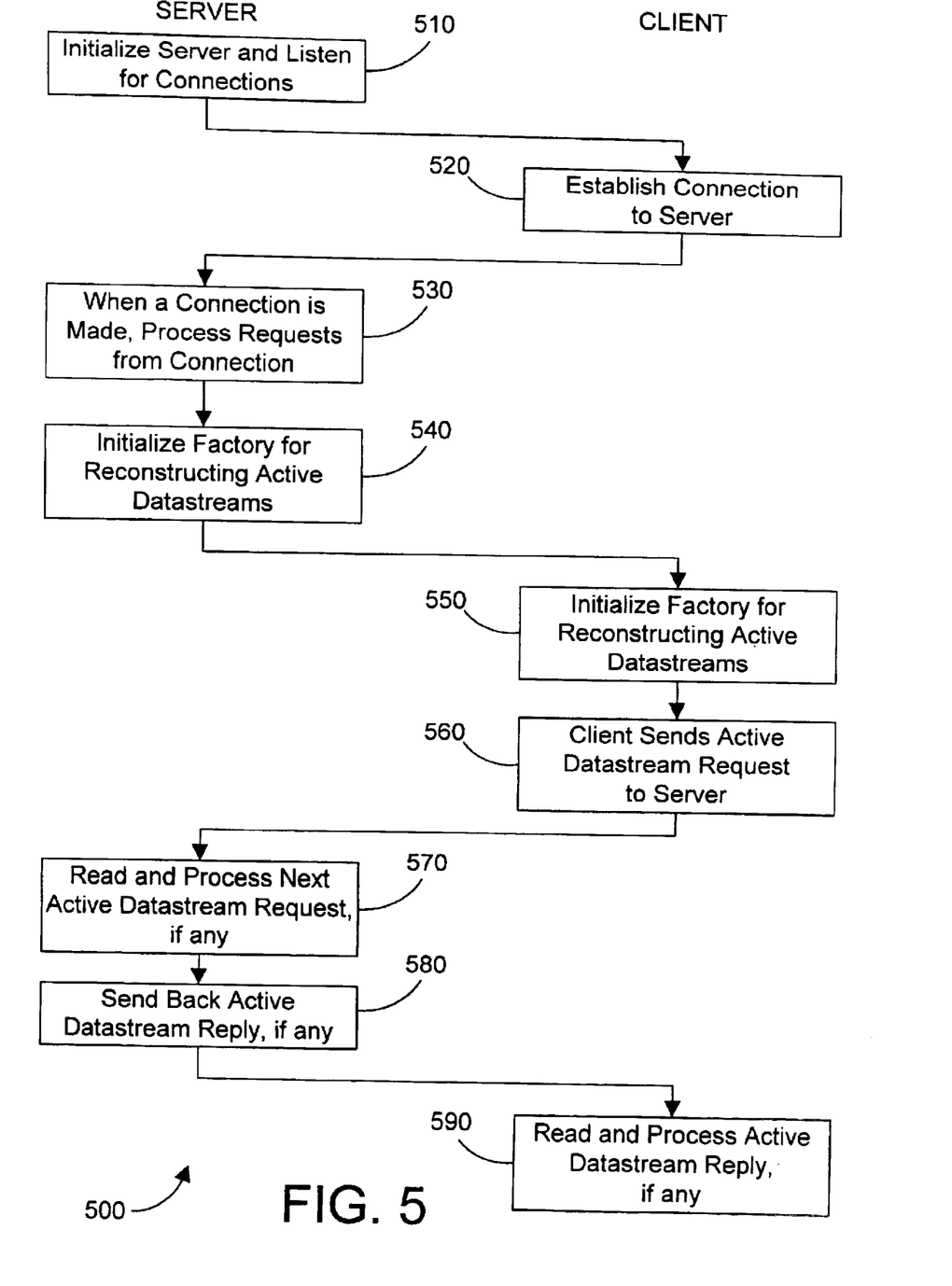
FIG. 5 is a flow diagram of a specific client/server system in accordance with a preferred embodiment of the present invention.

FIG. 5 is a flow diagram that illustrates the flow of control between server and client in one specific implementation of the preferred embodiments in a client/server scenario. First, the server is initialized and listens for connections (step 510). The client can then establish a connection to the server (step 520). When the connection is made, requests from the connection are processed (step 530). The server initializes the factory for reconstructing active datastreams (step 540), and the client must also initialize the factory for reconstructing active datastream (step 550). At this point, the client may send a request to the server in the form of an active datastream (step 560). In response, the server reads and processes the active datastream (step 570), and sends back an active datastream in reply, if needed (step 580). The client then reads and processes the active datastream reply (step 590).

Figure 6:
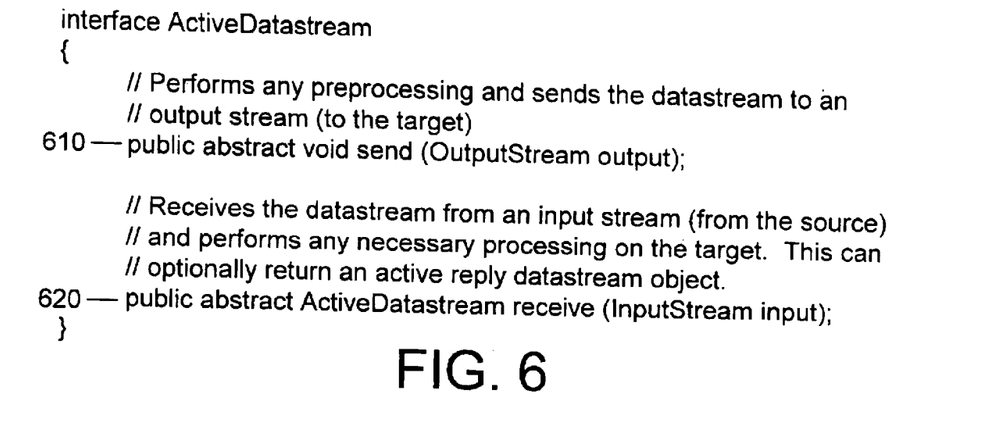
FIG. 6 shows Java pseudo-code for defining an interface for an active datastream.

The Java pseudo-code of FIGS. 6–9 show one specific Java implementation according to the preferred embodiments. A suitable object oriented interface for the datastream 290 of FIG. 2 is shown in FIG. 6. The ActiveDatastream interface defines a send method 610 for sending the active datastream to the target, and a receive method 620 for receiving the active datastream from the target, and for generating an appropriate reply, if needed. Note that the receive method 620 suitably includes code for performing the request, such as calls to other methods on the active datastream that are not shown.

Figure 7:
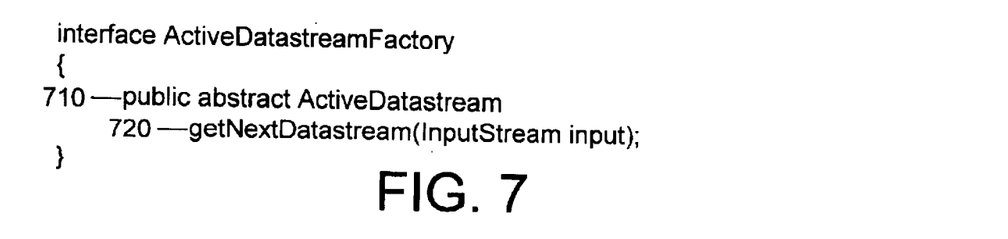
FIG. 7 shows Java pseudo-code for defining an interface for an active datastream factory.

A suitable interface for the datastream factory 232 of FIGS. 2 and 3 is shown in FIG. 7. A method getNextDataStream( ) 720 reads the InputStream from the source, and determines from the datastream identifier in the InputStream (i.e., the incoming active datastream) which datastream type corresponds to the datastream identifier. An instance ActiveDatastream 710 of the corresponding datastream type is returned. The ActiveDatastreamFactory thus reads an active datastream from the source, determines the type of the datastream being received, and returns an instance of that type.

Figure 8:
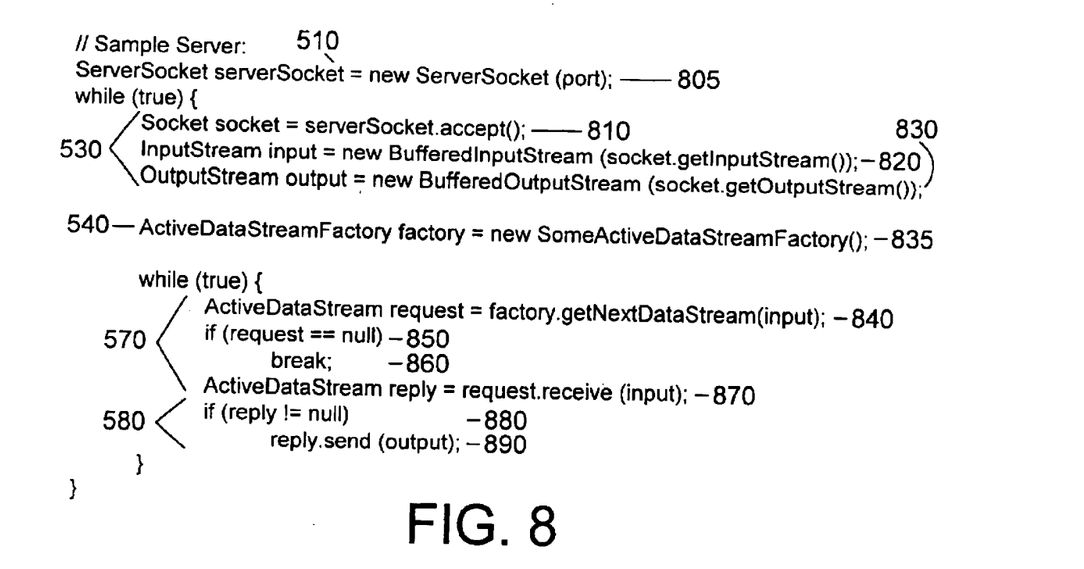
FIG. 8 shows Java pseudo-code for a sample server that performs the server steps shown in the flow diagram of FIG. 5.
Figure 9:
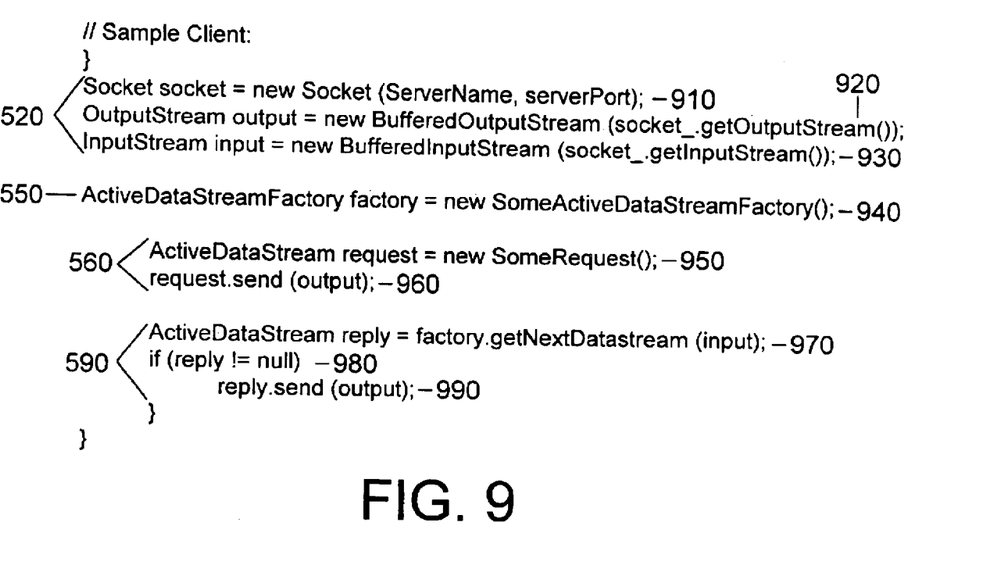
FIG. 9 shows Java pseudo-code for a sample client that performs the client steps shown in the flow diagram of FIG. 5.

FIGS. 8 and 9 show Java pseudo-code for implementing a client/server arrangement as shown in FIG. 5. Pseudo-code for a sample server is shown in FIG. 8, and pseudo-code for a sample client is shown in FIG. 9. Note that certain instructions in FIGS. 8 and 9 correspond to steps in FIG. 5. Thus, each step 510, 530, 540, 570 and 580 performed on the server has corresponding instructions in FIG. 8. Likewise, each step 520, 550, 560, and 590 performed on the client has corresponding instructions in FIG. 9.

Referring now to FIG. 8, the sample server is initialized and listening for connections (step 510) by executing an instruction 805 that creates a new instance of ServerSocket on the appropriate port. The server processes requests from the connection (step 530) using the instructions 810, 820 and 830. Instruction 810 establishes a connection with the server. Instruction 820 defines an input stream for receiving data from the socket. Instruction 830 defines an output stream for sending data to the socket. The datastream factory on the server is initialized (step 540) using instruction 835. Active datastream requests are read and processed (step 570) using instructions 840, 850, 860 and 870 of FIG. 8. Instruction 840 receives an active datastream request. Instructions 850 and 860 determine whether the request is null, and if so, disconnects the client. Instruction 870 then determines whether a reply to the request is required. If a reply is required, instructions 880 and 890 send the active datastream reply, as shown in step 580 of FIG. 5.

Referring to FIG. 9, the sample client establishes a connection to the server (step 520) using instructions 910, 920, and 930. Instruction 910 creates a socket connection to the server. Instruction 920 creates an output stream to the server and instruction 930 creates an input stream from the server. The datastream factory is initialized on the client (step 550) using instruction 940. The request is created in an active datastream in instruction 950, and the request is sent to the server in instruction 960 (step 560). Finally, step 590 determines whether a reply is needed by executing instruction 920, and if a reply is needed, instructions 980 and 990 send the reply to the server.

By encapsulating the logic for sending and receiving an active datastream, as well as logic for processing a request represented by the active datastream, maintenance of software to process the datastreams is much easier when compared to the prior art. In prior art systems, such as that shown in FIG. 1, if a new datastream is needed for a new type of request, the hard-coded datastream specification 150 would have to be changed in both the client 110 and the server 120. This modification to both client and server can be significant, and may entail a substantial amount of work. In addition, if there are a large number of clients, the change must be made to each and every client in order to give the client the additional function. Maintenance of the datastream processor 230 of the invention, however, is greatly simplified. Datastream factory 232 must be able to correlate a datastream identifier to a particular datastream type, and active datastream processor 230 suitably includes a table or other data structure for storing ID/datastream type pairs. When a new request needs to be added, a new datastream type is defined, and the interface for the new datastream type and its corresponding ID needs to be added to the table. This is the only change required to allow active datastream processor 230 to handle the new request. All of the logic for the request, along with the logic for sending and receiving the new active datastream corresponding to the request, is encapsulated in the source code file corresponding to the new active datastream.

In the prior art system of FIG. 1, the process for modifying how an existing datastream is processed is the same as adding a new datastream, i.e., the hard-coded datastream specification must be changed in the server and in each client. However, modifying how an existing active datastream is processed is a matter of simply changing the datastream class itself. No changes are required to the active datastream processor 230 on either the client or the server. As these examples above illustrate, code maintenance for a system 200 that uses active datastreams is greatly simplified compared to prior art systems.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while one preferred embodiment discloses the invention in a client/server system, the present invention applies regardless of the specific network configuration. Because the datastream processor 230 is identical on each machine, it doesn't matter whether there is a client/server network, peer-to-peer network, a direct wire connection, or any other suitable type of connection between computer systems. Regardless of the network configuration, the present invention applies to any two computers that need to communicate with each other. When a computer has an active datastream to send, it becomes the source computer, and the computer receiving the active datastream is the target computer. Any apparatus that is capable of sending and receiving active datastreams is within the scope of the present invention.

We claim:
1. A first computer system comprising:
at least one processor;
a memory coupled to the at least one processor;
a datastream residing in the memory and received from a second computer system coupled to the first computer system, the datastream including:
a send mechanism that is invoked by the second computer system to send the datastream to the first computer system; and
a receive mechanism that is invoked by the first computer system to receive the datastream;
a datastream factory residing in the memory and executed by the at least one processor, the datastream factory creating an instance of a datastream class correspond- ing to an identifier in the datastream received from the second computer system; and a datastream receive mechanism residing in the memory and executed by the at least one processor, the datastream receive mechanism defined in the datastream class, the datastream receive mechanism invoking the receive mechanism in the datastream to cause the instance of the datastream class to populate itself with information contained in the datastream.

2. The computer system of claim 1 further comprising a datastream processing mechanism residing in the memory for processing the instance of the datastream by invoking at least one object method on the instance.

3. The computer system of claim 1 further comprising a datastream send mechanism residing in the memory for sending the instance of the datastream by invoking at least one object method on the instance.

4. The computer system of claim 1 wherein the datastream identifies executable code residing in the memory for receiving the datastream from the second computer system.

5. The computer system of claim 4 wherein the datastream further identifies executable code residing in the memory for performing a request represented by the datastream.

6. The computer system of claim 5 wherein the datastream further identifies executable code residing in the memory for sending the datastream from the second computer system to the computer system.

7. A networked computer system comprising:
a first computer system coupled via a network connection to a second computer system;
each of the first and second computer systems comprising a datastream processor, the datastream processor including:
a datastream factory for creating an instance of an active datastream class corresponding to a datastream identifier received in a datastream on the network connection from the other computer system;
a datastream send mechanism defined in the active datastream class that when invoked causes the datastream to be sent to the other computer system; and
a datastream receive mechanism defined in the active datastream class that, when invoked, causes the instance of the active datastream class to populate itself with information contained in the datastream received on the network connection from the other computer system.

8. A networked computer system comprising:
a first computer system coupled via a network connection to a second computer system;
means for constructing an active datastream, the active datastream including a datastream identifier that identifies executable code for processing the active datastream;
means within the active datastream for sending the active datastream from the first computer system to the second computer system;
means for creating an instance of a datastream class that corresponds to the datastream identifier in the second computer system;
means defined in the datastream class for causing the instance of the datastream class to populate itself with information contained in the active datastream received from the first computer system.

9. The computer system of claim 8 further comprising:
means for processing the instance of the datastream class by invoking at least one object method on the instance.

10. The computer system of claim 8 further comprising:
means for sending the instance of the datastream class by invoking at least one object method on the instance.

11. A method for communicating between a first computer system and a second computer system, the method comprising the steps of:
the first computer system constructing an active datastream, the active datastream including:
a datastream identifier that identifies executable code for processing the active datastream;
a datastream send mechanism that is invoked by the first computer system to send the active datastream to the second computer system; and
a datastream receive mechanism that is invoked by the second computer system to receive the active datastream from the first computer system;
the first computer system sending the active datastream to the second computer system by invoking the datastream send mechanism in the datastream;
the second computer system creating an instance of a datastream class that corresponds to the datastream identifier; and
the instance of the datastream class populating itself with information contained in the active datastream received from the first computer system by invoking the datastream receive mechanism.

12. The method of claim 11 further comprising the step of executing the executable code on the datastream instance to process the active datastream.

13. The method of claim 11 wherein the step of the instance of the datastream class populating itself with the information contained in the active datastream includes the step of executing a receive method on the instance of the datastream class.

14. The method of claim 11 wherein the step of the first computer system sending the active datastream to the second computer system includes the step of invoking at least one object method on the active datastream.

15. A method for communicating between a first computer system and a second computer system, the method comprising the steps of:
the first computer system constructing an active datastream object, the active datastream object including a datastream identifier that identifies a corresponding datastream class that includes executable code corresponding to a plurality of object methods for processing the active datastream object;
the first computer system sending the active datastream to the second computer system by invoking a send method on the active datastream object;
the second computer system reading the datastream identifier from the active datastream object received from the first computer system;
the second computer system creating a new instance of the datastream class that corresponds to the datastream identifier;
the new instance of the datastream class populating itself with information contained in the active datastream received from the first computer system by invoking a receive method on the new instance; and
the second computer system performing a request represented by the active datastream by invoking at least one object method on the new instance.

16. A program product comprising:
a datastream factory that creates an instance of a datastream class corresponding to an identifier in a received datastream the received datastream including:

a send mechanism that is invoked to send the received datastream; and a receive mechanism;

a datastream receive mechanism defined in the datastream class that invokes the receive mechanism to cause the instance of the datastream class to populate itself with information contained in the received datastream and signal bearing media bearing the datastream factory and the datastream receive mechanism.

17. The program product of claim 16 wherein the signal bearing media comprises recordable media.

18. The program product of claim 16 wherein the signal bearing media comprises transmission media.

19. The program product of claim 16 further comprising a datastream processing mechanism on the signal bearing media for processing the instance of the datastream by invoking at least one object method on the instance.

20. The program product of claim 16 further comprising a datastream send mechanism on the signal bearing media for sending the instance of the datastream by invoking at least one object method on the instance.

21. A first computer system comprising:

at least one processor;

a memory coupled to the at least one processor;

an active datastream object residing in the memory, the active datastream object comprising:
   a first object method invoked in the first computer system to send the active datastream object as a datastream to a second computer system coupled to the first computer system; and
   a second object method invoked in the second computer system that causes the second computer system to receive the datastream from the first computer system.

22. The computer system of claim 21 further comprising:

a datastream factory residing in the memory and executed by the at least one processor, the datastream factory creating an instance of a datastream class corresponding to an identifier the datastream; and a datastream receive mechanism defined in the datastream class that invokes the second object method to cause the instance of the datastream class to populate itself with information contained in the datastream.

23. A method for communicating between a first computer system and a second computer system, the method comprising the steps of:

the first computer system constructing an active datastream object, the active datastream object including:
   a first object method that is invoked to send the active datastream object as a datastream; and
   a second object method that is invoked to receive the datastream;

the first computer system sending the datastream to the second computer system by invoking the first object method in the active datastream object;

the second computer system creating an instance of a datastream class that corresponds to an identifier in the datastream; and the instance of the datastream class populating itself with information contained in the datastream received from the first computer system by invoking the second object method.

24. A program product comprising:

(A) an active datastream object comprising:
   a first object method invoked in a first computer system to send the active datastream object as a datastream to a second computer system coupled to the first computer system; and
   a second object method invoked in the second computer system that causes the second computer system to receive the datastream from the first computer system; and (B) computer-readable signal bearing media bearing the active datastream object.

25. The program product of claim 24 wherein the signal bearing media comprises recordable media.

26. The program product of claim 24 wherein the signal bearing media comprises transmission media.

* * * * *